United States Patent
Iwasawa

(10) Patent No.: US 10,139,477 B2
(45) Date of Patent: Nov. 27, 2018

(54) ERRONEOUS DETECTION RESTRAINING CIRCUIT FOR LASER RANGE FINDER

(71) Applicant: OPTEX Co., Ltd., Shiga (JP)

(72) Inventor: Masashi Iwasawa, Shiga (JP)

(73) Assignee: OPTEX CO., LTD., Shiga (JP)

( * ) Notice: Subject to any disclaimer, the term of this patent is extended or adjusted under 35 U.S.C. 154(b) by 101 days.

(21) Appl. No.: 15/220,691

(22) Filed: Jul. 27, 2016

(65) Prior Publication Data

US 2017/0031011 A1    Feb. 2, 2017

(30) Foreign Application Priority Data

Jul. 31, 2015 (JP) ................... 2015-151888
Jun. 24, 2016 (JP) ................... 2016-125223

(51) Int. Cl.
| | |
|---|---|
| G01C 3/08 | (2006.01) |
| G01S 7/486 | (2006.01) |
| G01S 17/02 | (2006.01) |
| G01S 17/10 | (2006.01) |
| G01S 7/487 | (2006.01) |
| G01S 7/489 | (2006.01) |
| G01S 17/42 | (2006.01) |

(52) U.S. Cl.
CPC ............ *G01S 7/4868* (2013.01); *G01S 7/489* (2013.01); *G01S 7/4865* (2013.01); *G01S 7/4873* (2013.01); *G01S 17/026* (2013.01); *G01S 17/10* (2013.01); *G01S 17/42* (2013.01)

(58) Field of Classification Search
CPC ........ G01S 17/026; G01S 17/10; G01S 17/42; G01S 7/4873; G01S 7/489; G01S 7/4865; G01S 7/4868

USPC ......................................................... 356/5.01
See application file for complete search history.

(56) References Cited

U.S. PATENT DOCUMENTS

| | | | |
|---|---|---|---|
| 7,760,336 B2 | 7/2010 | Iwasawa | |
| 8,681,323 B2 | 3/2014 | Iwasawa et al. | |
| 2001/0033246 A1* | 10/2001 | Burchett | G01S 3/7864 342/91 |

(Continued)

FOREIGN PATENT DOCUMENTS

| | | |
|---|---|---|
| JP | 59-5981 | 1/1984 |
| JP | 59-142488 | 8/1984 |

(Continued)

*Primary Examiner* — Mark Hellner
(74) *Attorney, Agent, or Firm* — Wenderoth, Lind & Ponack, L.L.P.

(57) ABSTRACT

In a laser range finder, each reflected light reflected by at least one object of pulsed laser light emitted by a light emitting element reaches a light receiving element, and distance information to the at least one object is acquired based on an amount of time from a light emission starting time for the pulsed laser light to an output starting time from the light receiving element. An erroneous detection reducing circuit for the laser range finder includes: a comparator receiving as inputs a threshold and a light-reception output from the light receiving element; a time measuring section measuring time elapsed since the light emission starting time for the pulsed laser light; and a setting changing section changing either one or both of the threshold and an amplification factor of the comparator for the light-reception output in accordance with a time measurement value obtained by the time measuring section.

4 Claims, 6 Drawing Sheets

(56) References Cited

U.S. PATENT DOCUMENTS

2012/0113410 A1* 5/2012 Iwasawa ............... G01S 17/026
　　　　　　　　　　　　　　　　　　　　　356/5.01

FOREIGN PATENT DOCUMENTS

| JP | 5092076 | 12/2012 |
| JP | 5439684 | 3/2014 |

* cited by examiner

10

10A

ERRONEOUS DETECTION RESTRAINING CIRCUIT FOR LASER RANGE FINDER

CROSS-REFERENCE TO RELATED APPLICATIONS

The present application hereby claims priority under 35 U.S.C. § 119(a) on Patent Applications No. 2015-151888 filed in Japan on Jul. 31, 2015 and No. 2016-125223 filed in Japan on Jun. 24, 2016, the entire contents of which are hereby incorporated herein by reference.

BACKGROUND OF THE INVENTION

Field of the Invention

The present invention relates to time-of-flight (TOF) laser range finders that exploit reflection of pulsed laser light and in particular to erroneous detection restraining circuits for laser range finders capable of preventing close-range erroneous detection caused by fog, rain, dirt on a window face of a cover, and other like factors to a minimum possible.

Related Art

The inventor of the present invention previously suggested, in JP 5092076 B (hereinafter, "Patent Document 1"), a laser area sensor that can accurately detect an intruder or the like regardless of the installation location and weather conditions by eliminating, to the highest degree possible, the negative effects on the laser light during bad outdoor weather conditions or the like, and that can prevent erroneous detection to the highest degree possible.

In this invention disclosed in Patent Document 1, the third embodiment focuses on a solution to dense fog issues as described in reference to FIGS. 6(a) to 6(f). The third embodiment includes: a second laser range finder that emits pulsed laser light and measures a period of time for light reflected by at least one object that is present in a laser light emitting direction to return thereby to obtain distance information to the object and light-reception level information of the reflected light and time width information along the time axis of the reflected light; a scanning mechanism portion that changes a measurement direction of the second laser range finder; an information acquiring portion that defines a detection area and acquires distance information, light-reception level information and time width information in each measurement direction in the detection area in a time-series manner, by the second laser range finder periodically performing measurement while the scanning mechanism portion changes the measurement direction; an information correcting portion that performs correction with a second information correcting function that, if there is a discontinuous change exceeding a predetermined amount when the distance information and light-reception level information acquired by the information acquiring portion in each measurement period are compared with distance information and light-reception level information of measurement directions adjacent to the measurement direction, removes distance information corresponding to the discontinuous change in the measurement direction in the measurement period, and with a third information correcting function that, when a measurement direction range in which an amount of change between adjacent measurement directions all falls within a predetermined range is referred to as a detection angle width when the distance information, light-reception level information and time width information acquired by the information acquiring portion in each measurement period are compared with distance information, light-reception level information and time width information of a plurality of measurement directions adjacent to the measurement direction, removes specific distance information if light-reception level information, time width information and detection angle width that correspond to the specific distance information in the measurement direction satisfy a predetermined relationship; a human body judging portion that extracts a portion that is presumed to correspond to a human body, from the distance information corrected by the information correcting portion, and judges whether or not the extracted portion matches a human body based on a time-series moving status of the extracted portion; and a human body detection signal output portion that outputs a human body detection signal if the human body judging portion judges that a human body is present.

The inventor of the present invention also previously suggested, in JP 5439684 B (hereinafter, "Patent Document 2"), a laser scanning sensor capable of maintaining reliability of detection of intruders or the like as much as possible even when the cover of a light receiving portion is dirty.

This laser scanning sensor includes: a housing in which an opening portion is formed; a cover that is arranged so as to cover the opening portion and that can transmit laser light; a laser range finder that is arranged inside the housing, includes a laser light emitting portion for emitting laser light to outside of the housing through the cover and a laser light receiving portion for receiving laser light and outputting a signal according to the amount of the received light, and performs measurement by acquiring distance information to at least one object through measurement of a period of time taken for reflected light caused by the laser light emitted by the laser light emitting portion being reflected by the object to return, and acquiring received light level information of the reflected light; a scanning mechanism portion that changes a measurement direction performed by the laser range finder; an information acquisition portion that forms a detection area, as a result of acquisition of the distance information and the received light level information by the laser range finder being periodically performed while the measurement direction is being changed by the scanning mechanism portion, and that acquires, in time series, the distance information and the received light level information for each measurement direction in the detection area; a storage portion that stores, for each measurement direction, the distance information that corresponds to a farthest side out of the distance information for the measurement direction acquired by the information acquisition portion; a determination portion that determines whether a state in which measurement directions whose distance information corresponds to a near side of a predetermined distance and whose received light level is greater than or equal to a predetermined threshold occupy a predetermined proportion or more of all measurement directions has continued for at least a predetermined period of time; and an alert output control portion that outputs an alert signal according to a result of the determination performed by the determination portion, wherein the predetermined threshold to be compared with the received light level in the determination portion is changed based on the distance information stored for each measurement direction in the storage portion.

In a dense fog condition, an extremely large number of water droplets that are much smaller than raindrops, snowdrops and the like are suspended collectively in the air, and the pulsed laser light is diffused and reflected by the large number of small water droplets. As a result, in signal waveforms of received light, pulses, such as Pulse P71, Pulse P72, Pulse P73 and Pulse P74 shown in FIGS. 6(a) to 6(f) of Patent Document 1, appear in which the light-reception level hovers around a level lower than that of another reflection and the pulse time width along the time axis having a wider shape continuously exists for a relatively long period of time. Pulses with a substantially similar shape are present in adjacent measurement directions, and a substantially similar pulse condition is present over a continuously wide angle range.

In contrast, if dirt is attached to, for example, an outer portion of the cover of the light receiving portion of the laser range finder, not the whole of laser light emitted from the light emitting element is transmitted through the cover, and part of the laser light is slightly reflected by the dirt, which may reach a light receiving element. Even if it is only a small portion of the laser light that is reflected, since the distance to the cover is extremely short, the received light level of the reflected light may have a magnitude that is not ignorable. For example, a pulse waveform having a comparatively low peaked shape, such as a waveform Wx shown in FIGS. 5(a) to 5(c) of Patent Document 2, appears on the left side, which corresponds to the near side.

These conventional techniques in most cases determine presence of fog, dirt on the cover, and the like in accordance with the light-reception level (received light level) of reflected light.

However, for example, if there exist fog and dirt on the cover simultaneously in a particular measurement direction, further presence of a human body appears as a third signal on the time axis. An extremely complex process becomes inevitable to distinguish a human body from, for example, dirt on the cover and fog, which is an obstacle to achieving desirable precision in human body detection.

SUMMARY OF THE INVENTION

The present invention provides an erroneous detection restraining circuit for a laser range finder capable of preventing close-range erroneous detection caused by fog, rain, dirt on a window face of a cover, and other like factors to eliminate sources of misinformation.

An erroneous detection restraining circuit in accordance with the present invention is an erroneous detection restraining circuit for a laser range finder in which each reflected light reflected by at least one object of pulsed laser light emitted by a light emitting element reaches a light receiving element, and distance information to the at least one object is acquired based on an amount of time from a light emission starting time for the pulsed laser light to an output starting time from the light receiving element, the erroneous detection restraining circuit including: a comparator configured to receive as inputs a threshold and a light-reception output from the light receiving element; a time measuring section configured to measure time elapsed since the light emission starting time for the pulsed laser light; and a setting changing section configured to change either one or both of the threshold and an amplification factor of the comparator for the light-reception output in accordance with a time measurement value obtained by the time measuring section.

In this erroneous detection restraining circuit, the setting changing section may either decrease the amplification factor or increase the threshold while the time measurement value is less than or equal to a predetermined value. Furthermore, the setting changing section may either decrease the amplification factor stepwise or increase the threshold stepwise in accordance with the time measurement value while the time measurement value is less than or equal to a predetermined value. Alternatively, the setting changing section may either decrease the amplification factor continuously or increase the threshold continuously in accordance with the time measurement value while the time measurement value is less than or equal to a predetermined value.

The erroneous detection restraining circuit, configured as described above, prevents close-range erroneous detection caused by fog and other like factors and obviates, for example, the need for a process that distinguishes between fog and a human body at relatively close range. Hence, the erroneous detection restraining circuit can simplify the process of identifying a human body over the entire range.

The erroneous detection restraining circuit in accordance with the present invention prevents close-range erroneous detection caused by fog and other like factors and obviates, for example, the need for a process that distinguishes between fog and a human body at relatively close range. Hence, the erroneous detection restraining circuit can simplify the process of identifying a human body over the entire range.

BRIEF DESCRIPTION OF DRAWINGS

FIG. 4(a) represents a light-projection waveform. FIG. 4(b) represents a threshold, a received light waveform, and a comparator output when the fog detection preventing circuit 10 is out of operation. FIG. 4(c) represents a threshold, a received light waveform, and a comparator output when the fog detection preventing circuit 10 is in operation.

FIG. 5(a) represents a light-projection waveform. FIG. 5(b) represents a threshold, a received light waveform, and a comparator output when the fog detection preventing circuit 10 is out of operation. FIG. 5(c) represents a threshold, a received light waveform, and a comparator output when the fog detection preventing circuit 10 is in operation.

DESCRIPTION OF EMBODIMENTS

The following will describe fog detection preventing circuits that are specific examples of the erroneous detection restraining circuit as embodiments of the present invention in reference to drawings.

First Embodiment

Figure 1:
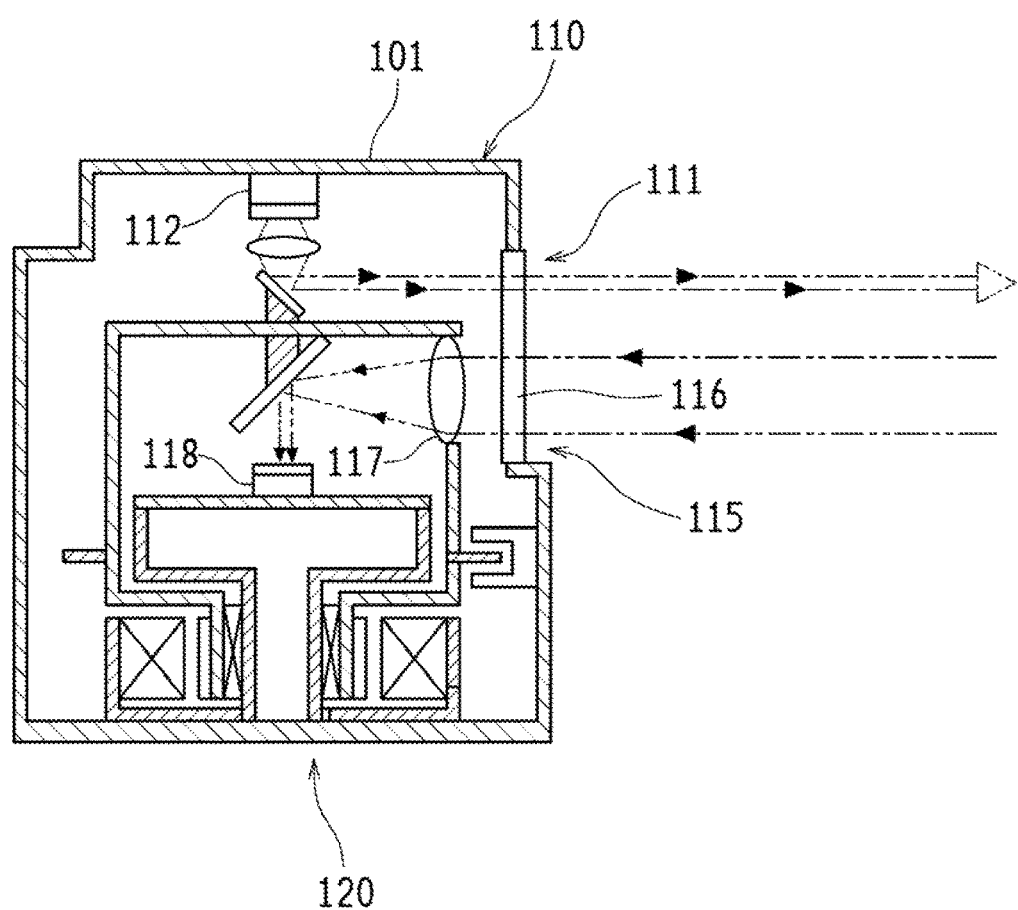
FIG. 1 is a schematic cross-sectional view of a configuration of a laser range finder 110 to which a fog detection preventing circuit 10 in accordance with a first embodiment of the present invention is applied.
Figure 2:
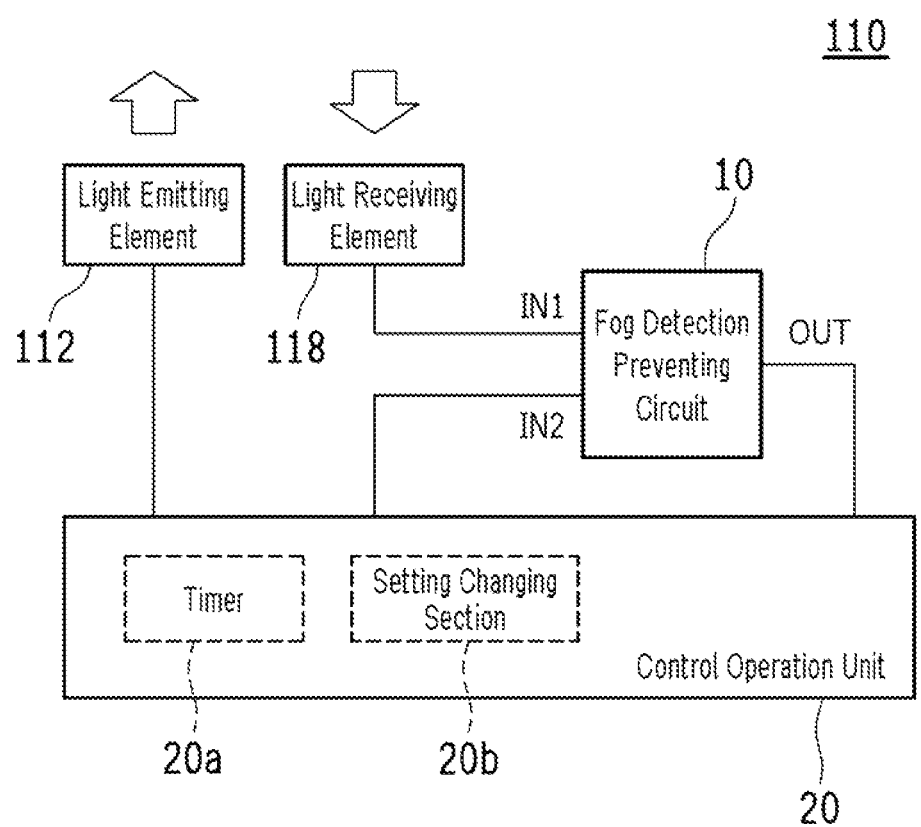
FIG. 2 is a schematic block diagram of an electrical configuration of the laser range finder 110.
Figure 3:
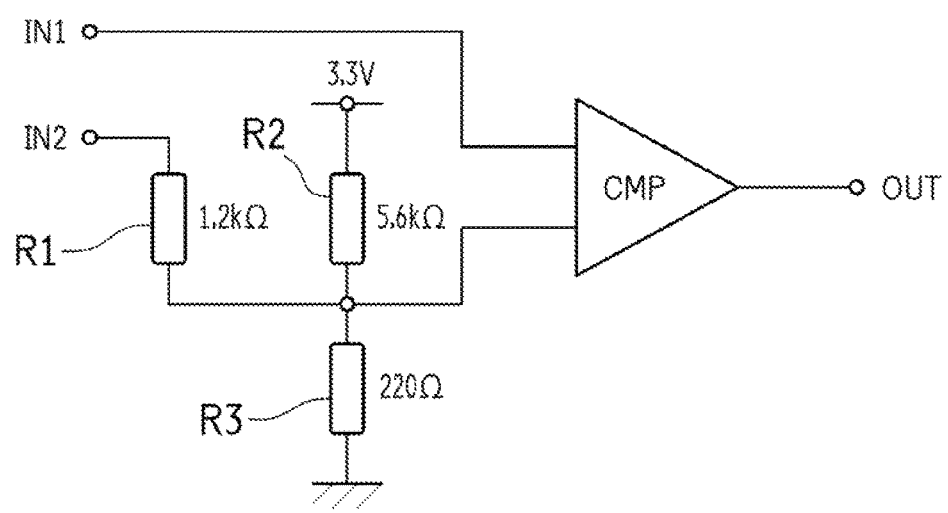
FIG. 3 is a schematic diagram of the fog detection preventing circuit 10.

FIG. 1 is a schematic cross-sectional view of a configuration of a laser range finder 110 to which a fog detection preventing circuit 10 in accordance with a first embodiment of the present invention is applied. FIG. 2 is a schematic block diagram of an electrical configuration of the laser range finder 110. FIG. 3 is a schematic diagram of the fog detection preventing circuit 10.

As shown in FIG. 1, the laser range finder 110 includes a laser light emitting section 111 and a laser light receiving section 115. The laser light emitting section 111 includes a laser light emitting element 112. The laser light receiving section 115 includes a light receiving lens 117 and a light receiving element 118. The laser range finder 110 is placed inside a housing 101 having an opening. The opening is covered with a lens cover 116 through which laser light can pass.

According to the laser range finder 110, pulsed laser light emitted from the laser light emitting element 112 in the laser light emitting section 111 passes through the lens cover 116 and reaches a human body or another like object that is present outside the housing 101. Part of the laser light reflected off such an object returns in the direction of the laser range finder 110 and passes through the lens cover 116 and then through the light receiving lens 117 before reaching the light receiving element 118. Distance data to the object such as a human body is acquired by precisely measuring a small amount of time from the emission of the pulsed laser light from the laser light emitting element 112 to the arrival of the reflected light to the light receiving element 118. Light-reception level data may additionally be acquired that represents intensity of the reflected light. If there is a plurality of objects in the direction in which the laser light is emitted, the distance data (and the light-reception level data) is acquired for each object.

The laser light emitting element 112 in the laser light emitting section 111 may be, for example, a semiconductor laser diode (LD). The light receiving element 118 may be, for example, an avalanche photodiode (APD). Dedicated hardware circuitry, as an example, may be desirably provided to control driving of the laser light emitting element 112, to measure the amount of time taken for the reflected light to return, and to acquire and record the light-reception level of the reflected light. This is however not the only possible configuration to achieve these purposes in this embodiment. A typical feature of laser range finders is their capability to precisely measure up to remarkably long distances, for example, no shorter than a few tens of meters, and in some cases, even much longer distances.

A scanning mechanism 120 may be provided, as shown in FIG. 1, mechanically connected to at least a part of the laser range finder 110, in order to change a measurement direction (angle) of the laser range finder 110. The scanning mechanism 120, if provided with a built-in electric motor and related components (not shown), becomes rotatable. As examples, either only the optical system in the laser range finder 110 or the entire laser range finder 110 may be configured to be rotatable. Other configurations are also possible. Rotating the scanning mechanism 120 at a certain rate in a predetermined direction enables the measurement direction of the laser range finder 110 to be changed in conjunction with this rotation.

As shown in FIG. 2, the laser range finder 110 includes the fog detection preventing circuit 10 and a control operation unit 20 in addition to the laser light emitting element 112 and the light receiving element 118 described above. The fog detection preventing circuit 10 has a first input terminal IN1 for receiving a light-reception output of the light receiving element 118, a second input terminal IN2 for control purposes, and an output terminal OUT for outputting a result of comparison. The control operation unit 20 has a control output terminal for the laser light emitting element 112, a control output terminal for the fog detection preventing circuit 10, and an input terminal for receiving an output from the output terminal OUT of the fog detection preventing circuit 10. The control operation unit 20 includes a timer 20a and a setting changing section 20b.

The control operation unit 20 may double, for example, as an arithmetic and control unit controlling other functions of the laser range finder 110 and controlling the entire apparatus including the scanning mechanism 120.

The fog detection preventing circuit 10, as shown in FIG. 3, includes therein a comparator CMP having an output thereof connected to the output terminal OUT. One of input terminals of the comparator CMP is connected to the first input terminal IN1 to receive the light-reception output of the light receiving element 118. The other input terminal of the comparator CMP is connected to a contact between a resistor R2 (5.6 kΩ) and a resistor R3 (220Ω) that are connected in series between a 3.3 V line and ground GND. The voltage that appears at this contact acts as a threshold for the comparator CMP. The contact is also connected to the second input terminal IN2 via a resistor R1 (1.2 kΩ).

This internal configuration of the fog detection preventing circuit 10 enables the comparator CMP to compare the light-reception output of the light receiving element 118 with the threshold. If the light-reception output is higher, the output terminal OUT outputs a HIGH level; otherwise, the output terminal OUT outputs a LOW level. The threshold inputted to the comparator CMP is variable with an input to the second input terminal IN2. If this input is the HIGH level, the threshold is about 600 mV; if the input is the LOW level, the threshold is about 100 mV.

Figure 4:
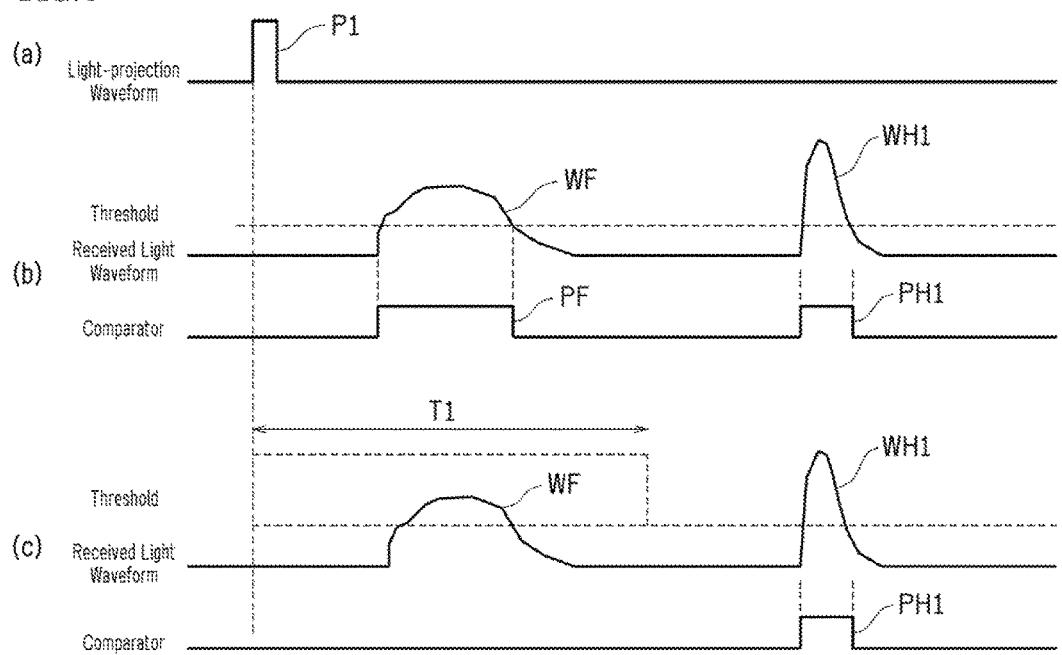
FIG. 4 is a time chart for an exemplary situation where there exist fog at relatively close range and a human body at relatively far range.

FIG. 4 is a time chart for an exemplary situation where there exist fog at relatively close range and a human body at relatively far range. FIG. 4(a) represents a light-projection waveform. FIG. 4(b) represents the aforementioned threshold, a received light waveform, and the aforementioned comparator output when the fog detection preventing circuit 10 is out of operation. FIG. 4(c) represents the aforementioned threshold, a received light waveform, and the aforementioned comparator output when the fog detection preventing circuit 10 is in operation.

As shown in FIG. 4(a), pulsed laser light is emitted in accordance with a light-projection waveform P1 outputted from the control operation unit 20 to the laser light emitting element 112.

When the fog detection preventing circuit 10 is out of operation, as shown in FIG. 4(b), there appear on the time axis a low and wide peak-shaped waveform WF corresponding to the fog at relatively close range and a high and narrow peak-shaped waveform WH1 corresponding to the human body at relatively far range. Because the input from the control operation unit 20 to the second input terminal IN2 of the fog detection preventing circuit 10 remains the LOW level, the threshold inputted to the comparator CMP remains about 100 mV. Therefore, at the output of the comparator CMP, there appear on the time axis a wide pulse waveform PF corresponding to the fog at relatively close range and a narrow pulse waveform PH1 corresponding to the human body at relatively far range.

In contrast, when the fog detection preventing circuit 10 is in operation, as shown in FIG. 4(c), the input from the control operation unit 20 to the second input terminal IN2 of the fog detection preventing circuit 10 is changed to the HIGH level throughout a predetermined period T1 starting at a time of rising of the light-projection waveform P1. Thus, the threshold inputted to the comparator CMP also rises to about 600 mV. Therefore, at the output of the comparator CMP, there appears on the time axis only the narrow pulse waveform PH1 corresponding to the human body at relatively far range, and no pulse waveform PF corresponding to the fog at relatively close range.

The predetermined period T1 is determined so that the threshold inputted to the comparator CMP is increased until a time equivalent of approximately 4 meters (or approximately 3 to 5 meters) of distance elapses because fog, up to approximately 4 meters away, could produce relatively intense reflected light that may cause erroneous detection.

For the TOF laser range finder 110 in which the laser light emitting section 111 and the laser light receiving section 115 are disposed independently as shown in FIG. 1, the axis of projected light and the axis of received light do not overlap and are separated by a distance at close range where fog could be detected. Accordingly, the light-reception level when fog is detected is less than or equal to a relatively low value. The light-reception level can be further lowered by using a non-spherical surface lens as a light projecting lens and the light receiving lens 117. In addition, it is known that at close range, a human body has a higher reflection level than fog. The aforementioned simple configuration is thus capable of removing adverse effects of fog without sacrificing human body detecting capability.

Figure 5:
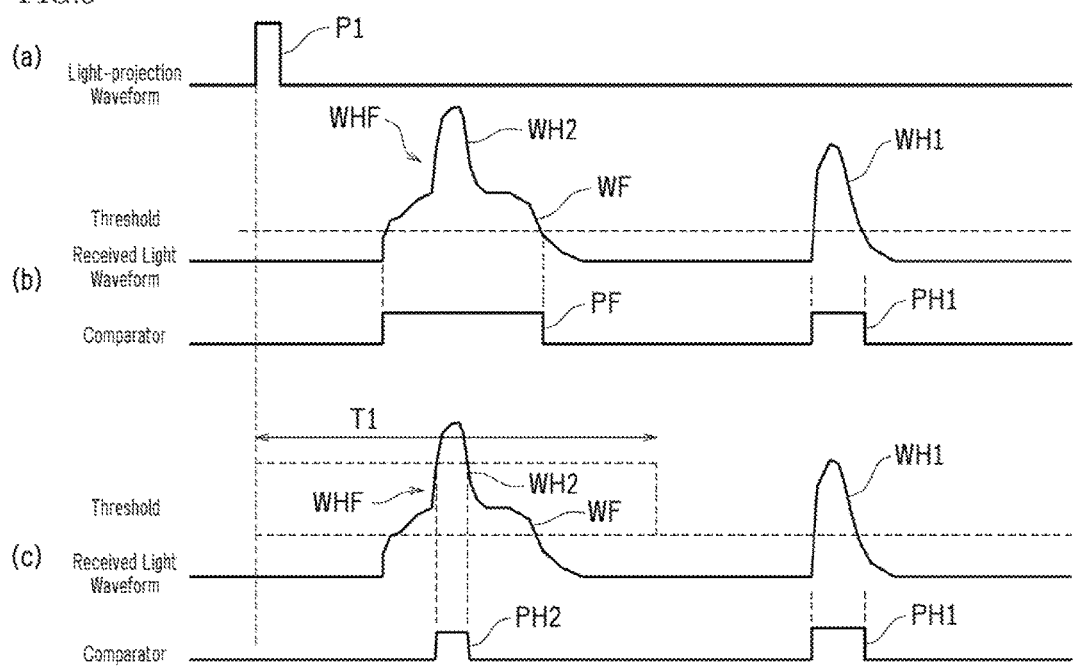
FIG. 5 is a time chart for an exemplary situation where there exist fog and a human body at relatively close range and another human body at relatively far range.

FIG. 5 is a time chart for an exemplary situation where there exist fog and a human body at relatively close range and another human body at relatively far range. FIG. 5(a) represents a light-projection waveform. FIG. 5(b) represents the aforementioned threshold, a received light waveform, and the aforementioned comparator output when the fog detection preventing circuit 10 is out of operation. FIG. 5(c) represents the aforementioned threshold, a received light waveform, and the aforementioned comparator output when the fog detection preventing circuit 10 is in operation.

As shown in FIG. 5(a), pulsed laser light is emitted in accordance with a light-projection waveform P1 outputted from the control operation unit 20 to the laser light emitting element 112, similarly to the situation represented in FIG. 4(a).

When the fog detection preventing circuit 10 is out of operation, as shown in FIG. 5(b), there appears at relatively close range on the time axis a composite waveform WHF of a low and wide peak-shaped waveform WF corresponding to the fog and a high and narrow peak-shaped waveform WH2 corresponding to one of the human bodies. There also appears a high and narrow peak-shaped waveform WH1 corresponding to the other human body at relatively far range. Because the input from the control operation unit 20 to the second input terminal IN2 of the fog detection preventing circuit 10 remains the LOW level, the threshold inputted to the comparator CMP remains about 100 mV. The peak-shaped waveform WF is wider than the peak-shaped waveform WH2. Therefore, at the output of the comparator CMP, there appear on the time axis a wide pulse waveform PF corresponding to the fog at relatively close range and a narrow pulse waveform PH1 corresponding to the other human body at relatively far range as in FIG. 4(b). In other words, at relatively close range, no human body can be detected due to the fog.

In contrast, when the fog detection preventing circuit 10 is in operation, as shown in FIG. 5(c), the input from the control operation unit 20 to the second input terminal IN2 of the fog detection preventing circuit 10 is changed to the HIGH level throughout the predetermined period T1 starting at the time of rising of the light-projection waveform P1. Thus, the threshold inputted to the comparator CMP also rises to about 600 mV. Therefore, at the output of the comparator CMP, there appear on the time axis a pulse waveform PH2 corresponding to one of the human bodies at relatively close range and the narrow pulse waveform PH1 corresponding to the other human body at relatively far range. In other words, the human body is also accurately detectable at relatively close range because erroneous detection caused by the fog is prevented.

According to the configuration of the first embodiment described so far, the relatively simply configured fog detection preventing circuit 10 is additionally provided to the laser range finder 110. The fog detection preventing circuit 10 can prevent fog at relatively close range from being erroneously detected and appearing at the output of the comparator CMP. This in turn can obviate, for example, the need for a process that distinguishes between fog and a human body at relatively close range and hence simplify the process of identifying a human body over the entire range.

Furthermore, the fog detection preventing circuit 10, additionally provided to a control operation circuit for the conventional TOF laser range finder, removes detection signals per se resulting from reflection off objects such as fog and a window face. Hence, the control operation circuit can be dedicated to processing of detection signals representing human bodies. This reduces workload in implementing a detection process and is expected to make some improvement in the detection performance of even a CPU with low processing power. In addition, the additional provision of the fog detection preventing circuit 10 can practically eliminate constraints that would occur in distinguishing between fog and a human body for detection and greatly improve close-range human body detecting capability in fog or a similarly poor environment.

Second Embodiment

Figure 6:
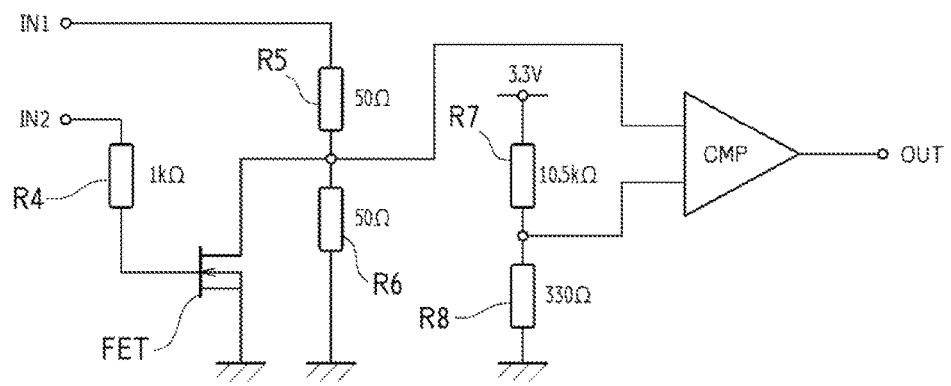
FIG. 6 is a schematic diagram of a fog detection preventing circuit 10A in accordance with a second embodiment of the present invention.

FIG. 6 is a schematic diagram of a fog detection preventing circuit 10A in accordance with a second embodiment of the present invention. Note that the second embodiment is the same as the first embodiment described in reference to FIG. 3, except for the points detailed below. The same members are denoted by the same reference numerals. Description will focus on differences between the two embodiments.

The fog detection preventing circuit 10A, as shown in FIG. 6, includes therein a comparator CMP having an output thereof connected to an output terminal OUT. One of input terminals of the comparator CMP is connected to a contact between a resistor R5 (50Ω) and a resistor R6 (50Ω) that are connected in series between ground GND and a first input terminal IN1 where a light-reception output of a light receiving element 118 is inputted. This contact is also connected to the drain of an FET whose source is grounded and whose gate is connected to a second input terminal IN2 via a resistor R4 (1 kΩ). The other input terminal of the comparator CMP is connected to a contact between a resistor R7 (10.5 kΩ) and a resistor R8 (330Ω) that are connected in series between a 3.3 V line and ground GND. The voltage that appears at this contact acts as a threshold for the comparator CMP.

This internal configuration of the fog detection preventing circuit 10A fixes the threshold to be inputted to the comparator CMP at about 100 mV. Instead, an input gain (amplification factor) for the light-reception output from the light receiving element 118 to the first input terminal IN1 can be changed through an input to the second input terminal IN2. When the input to the second input terminal IN2 is a LOW level, the input gain remains unchanged at approximately 1/1; when the input to the second input terminal IN2 is a HIGH level, the input gain falls to about 1/6.

The configuration of the second embodiment described so far can achieve effects substantially similar to those achieved by the first embodiment by changing an input from a control operation unit 20 to the second input terminal IN2 of the fog detection preventing circuit 10A to a HIGH level throughout a predetermined period T1 starting at a time of rising of a light-projection waveform P1.

Other Embodiments

In the first and second embodiments described above, the threshold for the comparator CMP or the input gain (amplification factor) for the light-reception output is discontinuously changed by changing the input from the control operation unit 20 to the second input terminal IN2 of the fog detection preventing circuit 10 or 10A to the HIGH level throughout the predetermined period T1 starting at the time of rising of the light-projection waveform P1.

Alternatively, for example, the threshold for the comparator CMP or the input gain (amplification factor) for the light-reception output may be changed stepwise during the predetermined period T1 starting at the time of rising of the light-projection waveform P1 by D/A converting the output of the control operation unit 20 and running a program in the control operation unit 20. Further alternatively, the threshold for the comparator CMP or the input gain (amplification factor) for the light-reception output may be changed continuously with time elapsed since the time of rising of the light-projection waveform P1 unit the predetermined period T1 elapses.

In addition, these changes may be made in an analog manner using a charge and discharge circuit composed of CR and other related circuits, instead of being made digitally using the timer 20*a* in the control operation unit 20.

The present invention may be implemented in various forms without departing from its spirit and main features. Therefore, the aforementioned embodiments and examples are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

REFERENCE NUMERALS

10 Fog Detection Preventing Circuit
10A Fog Detection Preventing Circuit
20 Control Operation Unit
20*a* Timer
20*b* Setting Changing Section
101 Housing
110 Laser Range Finder
111 Laser Light Emitting Section
112 Laser Light Emitting Element
115 Laser Light Receiving Section
116 Lens Cover
117 Light Receiving Lens
118 Light Receiving Element
120 Scanning Mechanism

What is claimed is:

1. An erroneous detection restraining circuit for a laser range finder in which each reflected light reflected by at least one object of pulsed laser light emitted by a light emitting element reaches a light receiving element, and distance information to the at least one object is acquired based on an amount of time from a light emission starting time for the pulsed laser light to an output starting time from the light receiving element,
the erroneous detection restraining circuit comprising:
a comparator configured to receive as inputs a threshold and a light-reception output from the light receiving element;
a time measuring section configured to measure time elapsed since the light emission starting time for the pulsed laser light; and
a setting changing section configured to change either one or both of the threshold and an amplification factor of the comparator for the light-reception output in accordance with a time measurement value obtained by the time measuring section.

2. The erroneous detection restraining circuit according to claim 1, wherein the setting changing section either decreases the amplification factor or increases the threshold while the time measurement value is less than or equal to a predetermined value.

3. The erroneous detection restraining circuit according to claim 2, wherein the setting changing section either decreases the amplification factor stepwise or increases the threshold stepwise in accordance with the time measurement value while the time measurement value is less than or equal to a predetermined value.

4. The erroneous detection restraining circuit according to claim 2, wherein the setting changing section either decreases the amplification factor continuously or increases the threshold continuously in accordance with the time measurement value while the time measurement value is less than or equal to a predetermined value.

* * * * *